(No Model.) 3 Sheets—Sheet 3.
T. C. NASH.
ART OF SPLICING CABLES.
No. 345,719. Patented July 20, 1886.
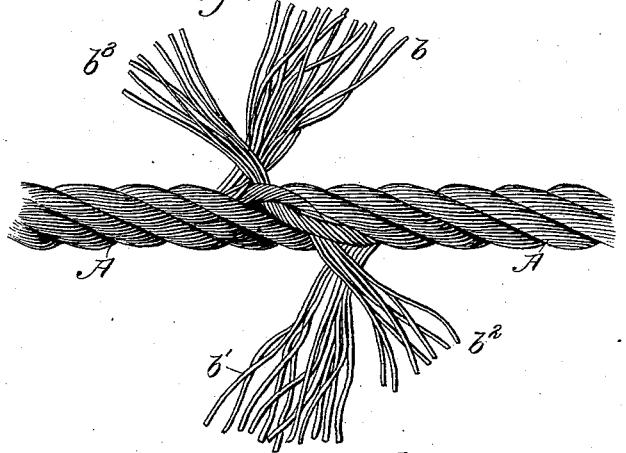
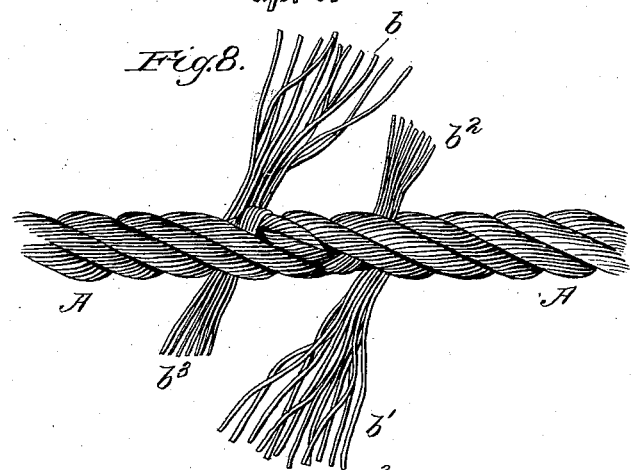
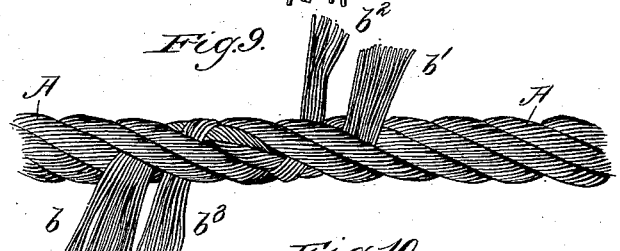
Witnesses.
Will R. Omohundro.
Chas. G. Page.
Inventor
Thomas C. Nash
By,
Jno. G. Elliott
Atty.

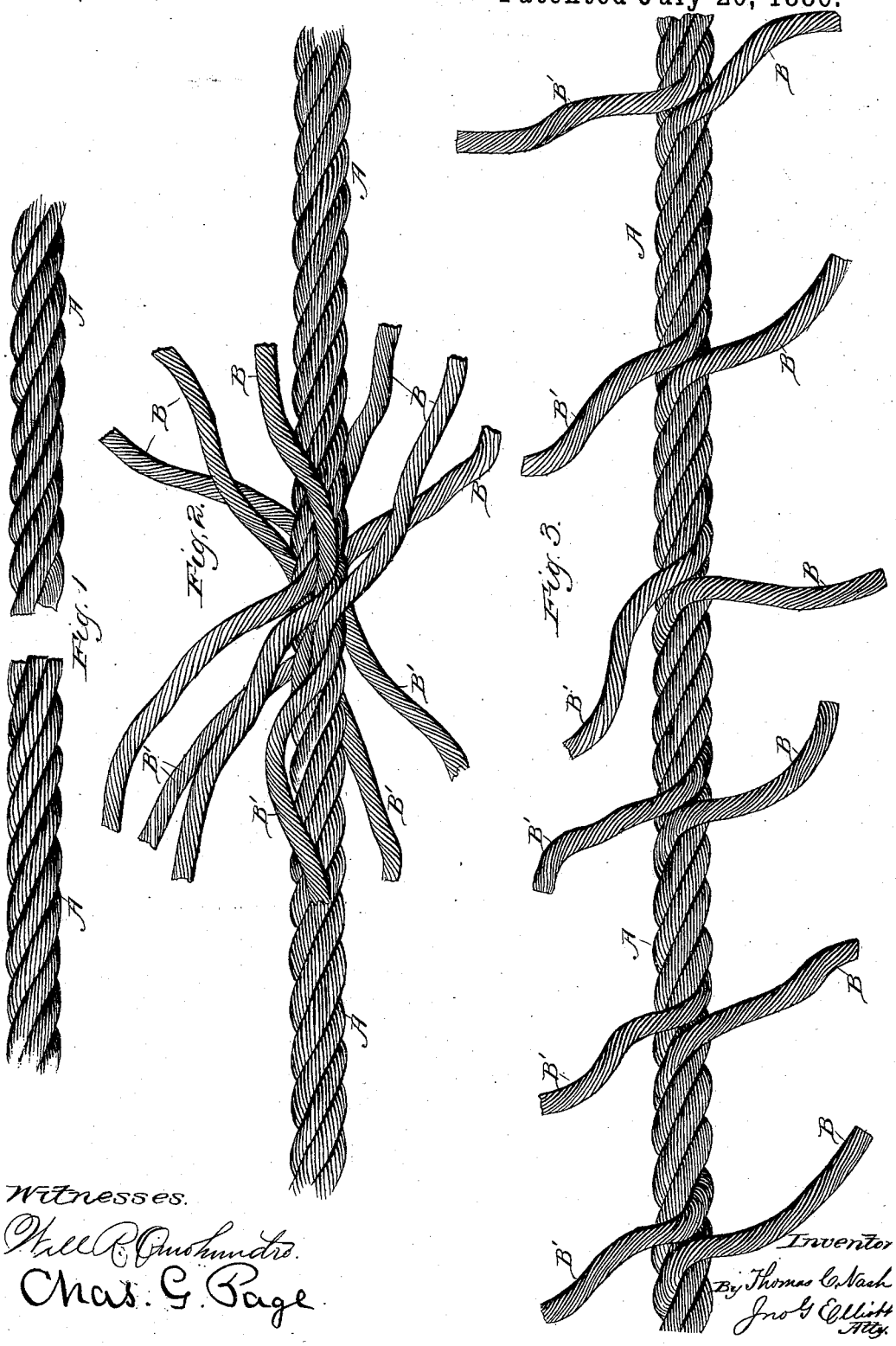

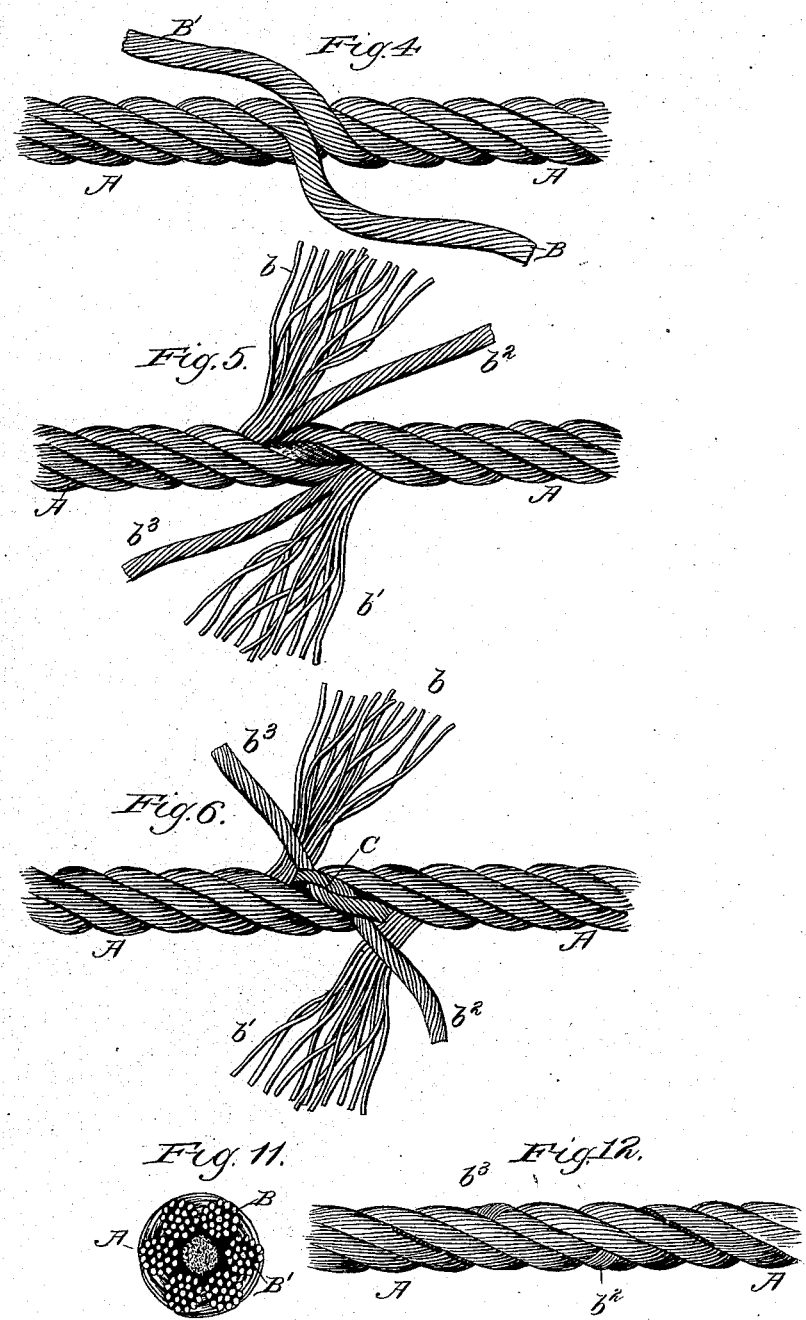

UNITED STATES PATENT OFFICE.

THOMAS C. NASH, OF CHICAGO, ILLINOIS.

ART OF SPLICING CABLES.

SPECIFICATION forming part of Letters Patent No. 345,719, dated July 20, 1886.

Application filed December 17, 1883. Serial No. 114,737. (No model.)

*To all whom it may concern:*

Be it known that I, THOMAS C. NASH, a citizen of the United States, residing in Chicago, county of Cook, and State of Illinois, have invented certain new and useful Improvements in the Art of Splicing Cables, of which the following is a specification.

In cable railways the cable passing between the jaws of the "grip" connected with the car to be drawn over the road is frequently traveling at a greater rate of speed than the car, the grip in such cases being put on to such extent that its jaws, while clamping the cable sufficiently to cause the movement of the car, shall at the same time allow the cable to slip between them. This, in addition to the fact that the cable passes along sheaves or other guides at various points in the road, renders it a matter of great importance to the success of the cable railway that the cable employed should be of a uniform diameter throughout and free from enlargement at such point or points as it may be spliced, since should the cable be enlarged by reason of a splice it will cut and wear away at the point of enlargement, and thereby become weakened and consequently break under the great strain to which it is subjected in use. The cable is necessarily spliced in the first instance to make it endless, and even under the most favorable circumstances a cable employed in cable roads will sometimes break by reason of undue strain, change of temperature, long use, or imperfections in the material, and when thus broken will require splicing.

The splices heretofore made in these cables have not proved satisfactory, for several reasons. In some instances an attempt has been made to form the splice without weakening the cable at the joint; but in such case an enlargement or inequality in form of the cable has been necessitated at such point, and, on the other hand, where it has been attempted to form the splice made without enlarging the cable, the uniformity in the diameter of the latter has been preserved at the expense of strength, since in this latter instance the wires have been either in part cut away, or some cut away and others tapered off at their ends, or all of the wires made tapering before the splice is made, thereby weakening the cable. In other instances a splice has been made by unlaying back to different points in the cable a portion of the strands from each of the two meeting ends and then laying the remaining strands of each end portion in the scores in the opposing end portion, after which the cable has been opened at each point where two opposing end portions of the cable meet, and at such points the core or center removed and the ends of the strands tucked in; but this method is objectionable, first, because it necessitates the removal of portions of the core or center, and, next, because it is found that an enlargement occurs at the point of tucking in the strands, and the strands are not anchored or held with sufficient firmness in the cable to prevent them from slipping under the great strain to which the cable is subjected.

My invention relates to spliced cables in which the strands of two meeting ends of the cable are alternately unlaid back to different points, and the opposing strands laid in the scores thus formed, and has for its object to obviate the defects heretofore existing in spliced cables, and to provide an improved method of securing at different points in the cable the meeting ends of the strands in such manner that there shall be no appreciable enlargement in the diameter of the cable at the joint or splice, and at the same time the combined strength of all the wires be preserved, whereby the cable shall not be weakened at such point, but, on the contrary, be as strong at the splice as at any of its remaining portions. These objects I attain by forming the splice in the manner hereinafter described and claimed, and illustrated in the annexed drawings, in which the several figures successively represent the several successive steps necessary to form a splice in accordance with my invention. For convenience of description, these figures will be referred to in their consecutive order in describing my improved method of forming the splice.

The cable herein shown is composed of six strands, each consisting of nineteen wires, it being, however, understood that my invention is applicable to cables having any number of strands and wires.

In Figure 1, A A denote the two meeting ends of a cable to be spliced, the strands in this figure being shown twisted together, as usual.

The first step taken in order to prepare the cable for splicing in accordance with my invention is to untwist or separate all of the strands B B' for a suitable distance from the terminals of these end portions of the cable, and to then cut off the exposed center or core, usually consisting of tarred rope, at a point close up to the point where the said separation of the strands in each end portion of the cable ceases, in order that when the terminals of the center around which the strands are twisted are brought together end to end a sufficient length of each strand shall be left free for splicing, and also so that the strands can be interlocked or laid successively one over the other, as illustrated in Fig. 2, which shows a cable in which the two terminals of the center are brought together. After bringing the two end portions of the cable together, and arranging the free ends of the strands as in said Fig. 2, alternate strands of the two end portions of the cable are unlaid back to different points in the cable, and the opposing strands carried forward and laid in the scores thus formed—that is to say, alternate strands of each end portion are unlaid to different points—thus forming scores of different lengths, and the strands of each end portion that are not unlaid are carried forward and laid in the scores of the opposing end portion, whereby the cable shall be brought substantially into the condition shown in Fig. 3, in which it will be seen that wherever a strand has been unlaid from one end portion of the cable the score left by unlaying such strand is filled by a strand from the opposing end portion of the cable, which replaces the unlaid strand so far as such strand is unlaid. At each point where a pair of these strands meet a sufficient length of the strands will be left for the tying and tucking, any surplus length of strand being cut off by the operator.

In the foregoing operations of separating and unlaying all of the strands back from the center, and also of unlaying the strands back to different points, it is essential that the strands should be held together at such points as are selected for the limits of the general separation and of the subsequent unlaying of alternate strands, and this can be readily accomplished by wrapping a cord or wire round the cable or by gripping it with some suitable gripping-tool. After thus alternately unlaying and laying the strands B B' of the two end portions of the cable, the next step is to prepare the strands for tying and tucking, and as a description of the method of tying and tucking any two of the meeting strands shown in Fig. 3 will serve for all, I have shown in Fig. 4 two of such meeting strands ready for the next step of the operation. Of these two strands B B' a number of the wires $b\, b'$ of each is untwisted back a short distance, as illustrated in Fig. 5, the number of wires untwisted being preferably greater than those not untwisted, for reasons presently explained—as, for example, should each strand be composed of nineteen wires, the twelve outside wires of each can be untwisted, and the remaining seven inner wires be left in a twisted condition, as illustrated. The two untwisted end portions $b\, b'$ of the strands are then tied together in an ordinary single knot or tie, C, as in Fig. 6, and the half-knot thus formed drawn tight, so as to bring it well down in the score in the cable, and as each one of these tied ends comprises a less number of strands than one-half a full strand, and consequently the two, when thus combined, form a less number of wires than the full number of a complete strand, the knot will lie slightly below the regular circumference of the cable, and the diameter of the latter at the point where such knot occurs will be less than the full diameter of the cable. The inner wires constituting the end portions $b^2\, b^3$ of the strands thus tied together are then untwisted from the terminals of said end portions back to the knot, as in Fig. 7, in which the wires are also indicated by the letters $b^2\, b^3$, whereby all of the wires at the terminals of the two meeting strands are now in an untwisted condition, with the portions of said strands tied together back of the untwisted wires by a single tie. The wires are now ready for the tucking operation, which is accomplished by opening the cable at each side of the knot by means of a splicing-fid or other convenient tool, and then tucking the wires under the continuous strands of the cable, and drawing them through the latter. Thus, as shown in Figs. 8 and 9, the terminals of the tied wires $b^2\, b^3$ and of the untied portions $b\, b'$ of each strand are passed under two of the strands of the cable, but at different points—as, for example, the wires $b^2$ of a tied portion of one strand are at one side of the knot tucked in the cable, together with the wires $b'$ of the untied portion of the second strand, which latter furnishes at the opposite side of the knot the seven inner wires that are tucked in the cable alongside of the twelve outer wires of the first said strand. The wires thus tucked and drawn through the cable are cut off at their ends close to the cable, as in Fig. 10, and are arranged to lie in a plane coincident with the twist of the cable, whereby the cable will have its diameter only increased the thickness of a single wire, and even this slight increase in diameter will in practice be found to entirely disappear as soon as the cable is subjected to sufficient tension, after which the cable will appear as in Fig. 12. By forming the splice in this way the cable will have the combined strength of all the wires at the splice, without increasing its diameter at such point, and without weakening the cable, and also the tied and tucked portions of the splice will be distributed along the cable in a neat and efficient manner, and the knot will lie below the circumference of the cable, out of the way, and protected from the grip.

In practice the wires of the tied portions of the strand, will at the knot have the same or substantially the same twist as the general twist of the strand. In Fig. 11, which shows a cross-section of the cable, the true twist of such wires in the knot is not shown, in order to more clearly define the strands; but in Fig. 12 the true twist of the wires is shown.

As the prime object of my invention is to splice without substantially increasing the thickness of the cable, it will be understood that the essential steps of my method are the tying together two opposing strands, and then tucking the ends of the strand-wires projecting from the knot in an untwisted condition in the cable; and it will therefore be seen that to knot in their entirety the opposing strands and then tuck the strands in an untwisted condition in the cable would be within the scope of my invention, although it is not new to knot in their entirety two opposing strands, and then tuck the projecting ends in a twisted condition in the cable. Nor would it be a substantial departure from my invention to cut the inner wires on each side of the knot and tuck only the outside wires in an untwisted condition in the cable.

Having thus described my invention, what I claim, and desire to secure by Letters Patent, is—

1. The herein-described method of splicing cables, the same consisting in unlaying all the strands of both ends of the cable, then bringing said ends together close up to their laid portions, with the unlaid strands of each of said ends locked or laid between the opposing strands of the other, then unlaying back to different points alternate strands of each end and carrying forward in the scores of the unlaid strands the corresponding strands of the opposing end, then tying together the meeting ends of the strands and tucking the terminals of the wires of said strands in an untwisted condition in the cable.

2. The herein-described method of splicing cables, the same consisting in unlaying all the strands of both ends of the cable, then bringing said ends together close up to their laid portions, with the unlaid strands of each of said ends locked or laid between the opposing strands of the other, then unlaying back to different points alternate strands of each end and carrying forward in the scores of the unlaid strands the corresponding strands of the opposing end, then tying together the inner end wires only of the meeting strands, and tucking the terminals of the outside wires in an untwisted condition in the cable.

3. The herein-described method of splicing cables, the same consisting in unlaying all the strands of both ends of the cable, then bringing said ends together close up to their laid portions, with the unlaid strands of each of said ends locked or laid between the opposing strands of the other, then unlaying back to different points alternate strands of each end and carrying forward in the scores of the unlaid strands the corresponding strands of the opposing end, then tying together the inner wires only of the meeting strands, and tucking the terminals of both the inside and outside wires of the strands in an untwisted condition in the cable.

4. The herein-described method of splicing cables, the same consisting in unlaying all the strands of both ends of the cable, then bringing said ends together close up to their laid portions, with the unlaid strands of each of said ends locked or laid between the opposing strands of the other, then unlaying back to different points alternate strands of each end, and carrying forward in the scores of the unlaid strands the corresponding strands of the opposing end, then tying together a portion of the wires of each meeting strand, and tucking all of the wires of both strands in the cable in planes, substantially as described, coincident with the twist of the cable.

THOS. C. NASH.

Witnesses:
W. W. ELLIOTT,
M. M. HOOTON.